United States Patent
Ying Chiu

(10) Patent No.: US 10,825,053 B2
(45) Date of Patent: Nov. 3, 2020

(54) CHARACTERIZED WIRELESS SIGNAL MOBILE MESSAGING METHOD AND SYSTEM

(71) Applicant: MIRUM DIGITAL MEDIA LIMITED, Wanchai (HK)

(72) Inventor: Herbert Lee Ying Chiu, Wan Chai (HK)

(73) Assignee: MIRUM DIGITAL LIMITED, Wanchai (HK)

( * ) Notice: Subject to any disclaimer, the term of this patent is extended or adjusted under 35 U.S.C. 154(b) by 1200 days.

(21) Appl. No.: 14/934,836

(22) Filed: Nov. 6, 2015

(65) Prior Publication Data
US 2016/0239872 A1    Aug. 18, 2016

(30) Foreign Application Priority Data
Feb. 16, 2015  (HK) ................................. 1201412

(51) Int. Cl.
G06Q 30/00     (2012.01)
G06Q 30/02     (2012.01)

(52) U.S. Cl.
CPC ..... *G06Q 30/0267* (2013.01); *G06Q 30/0203* (2013.01); *G06Q 30/0204* (2013.01); *G06Q 30/0257* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 5,801,754 A | 9/1998 | Ruybal et al. | |
| 5,864,626 A | 1/1999 | Braun et al. | |
| 5,916,024 A | 6/1999 | Von Kohorn | |
| 7,010,098 B2 | 3/2006 | Moquin et al. | |
| 7,526,278 B2 * | 4/2009 | Link, II | G06Q 30/0207 705/14.64 |
| 8,752,118 B1 | 6/2014 | Davis et al. | |
| 8,781,502 B1 * | 7/2014 | Middleton | G06Q 30/0261 455/456.3 |

(Continued)

FOREIGN PATENT DOCUMENTS

| | | |
|---|---|---|
| CN | 101587674 A | 11/2009 |
| CN | 101720034 A | 6/2010 |

(Continued)

OTHER PUBLICATIONS https://en.wikipedia.org/w/index.php?title=Bluetooth_advertising&oldid=556943598, May 27, 2013. (Year: 2013).*

(Continued)

*Primary Examiner* — Michael Bekerman
(74) *Attorney, Agent, or Firm* — Duane Morris LLP

(57) ABSTRACT

Disclosed are methods and systems of communicating signals among promoter, audience, promotion operator by way of wireless signaling and mobile messaging. The methods can be used in, but not limited to, mobile messaging, TV promotion, digital out-of-home promotion, storefront promotion, location specific promotion or announcement and others. The advantage of this method is that the messaging or promotion or announcement is not in broadcast mode. It can be targeted to a choice of specific type of Audience through their mobile devices.

51 Claims, 2 Drawing Sheets

A diagram illustrating the interaction among the receiver side, the sender side and the Processing Operator in the Characterized Wireless Signal Mobile Messaging Method

(56) References Cited

U.S. PATENT DOCUMENTS

| | | | |
|---|---|---|---|
| 2002/0119823 A1 | 8/2002 | Beuscher | |
| 2003/0144017 A1 | 7/2003 | Iselberg | |
| 2009/0061910 A1 | 3/2009 | Garbo | |
| 2010/0222041 A1 | 9/2010 | Dragt | |
| 2010/0306812 A1* | 12/2010 | Slothouber | H04N 21/252 725/114 |
| 2011/0288917 A1* | 11/2011 | Wanek | G06Q 30/0252 705/14.5 |
| 2012/0185888 A1 | 7/2012 | Eyer et al. | |
| 2013/0173358 A1* | 7/2013 | Pinkus | G06Q 30/0265 705/14.1 |
| 2015/0088649 A1* | 3/2015 | Herman | G06Q 30/0256 705/14.54 |
| 2016/0196582 A1* | 7/2016 | Stone | G06Q 30/0267 705/14.58 |

FOREIGN PATENT DOCUMENTS

| | | |
|---|---|---|
| CN | 201639685 U | 11/2010 |
| CN | 102074176 A | 5/2011 |
| CN | 102592232 A | 7/2012 |
| CN | 202617290 U | 12/2012 |
| CN | 103152106 A | 6/2013 |
| CN | 103516856 A | 1/2014 |
| JP | 2012078928 A | 4/2012 |
| JP | 2012155706 A | 8/2012 |
| JP | 2013183327 A | 9/2013 |
| TW | 201336233 A | 9/2013 |
| TW | 201351985 A | 12/2013 |
| WO | WO 2014/040180 A1 | 3/2014 |

OTHER PUBLICATIONS

Jan. 3, 2019 Search Report issued by China's National Intellectual Property Association for Chinese Patent Application No. 2015103170136.

May 25, 2018 Search Report issued by the Japanese Patent Office for Japanese Patent Application No. 2017-542240.

Apr. 26, 2016 European Search Report issued by the European Patent Office for European Patent Application No. 15194617.5.

* cited by examiner

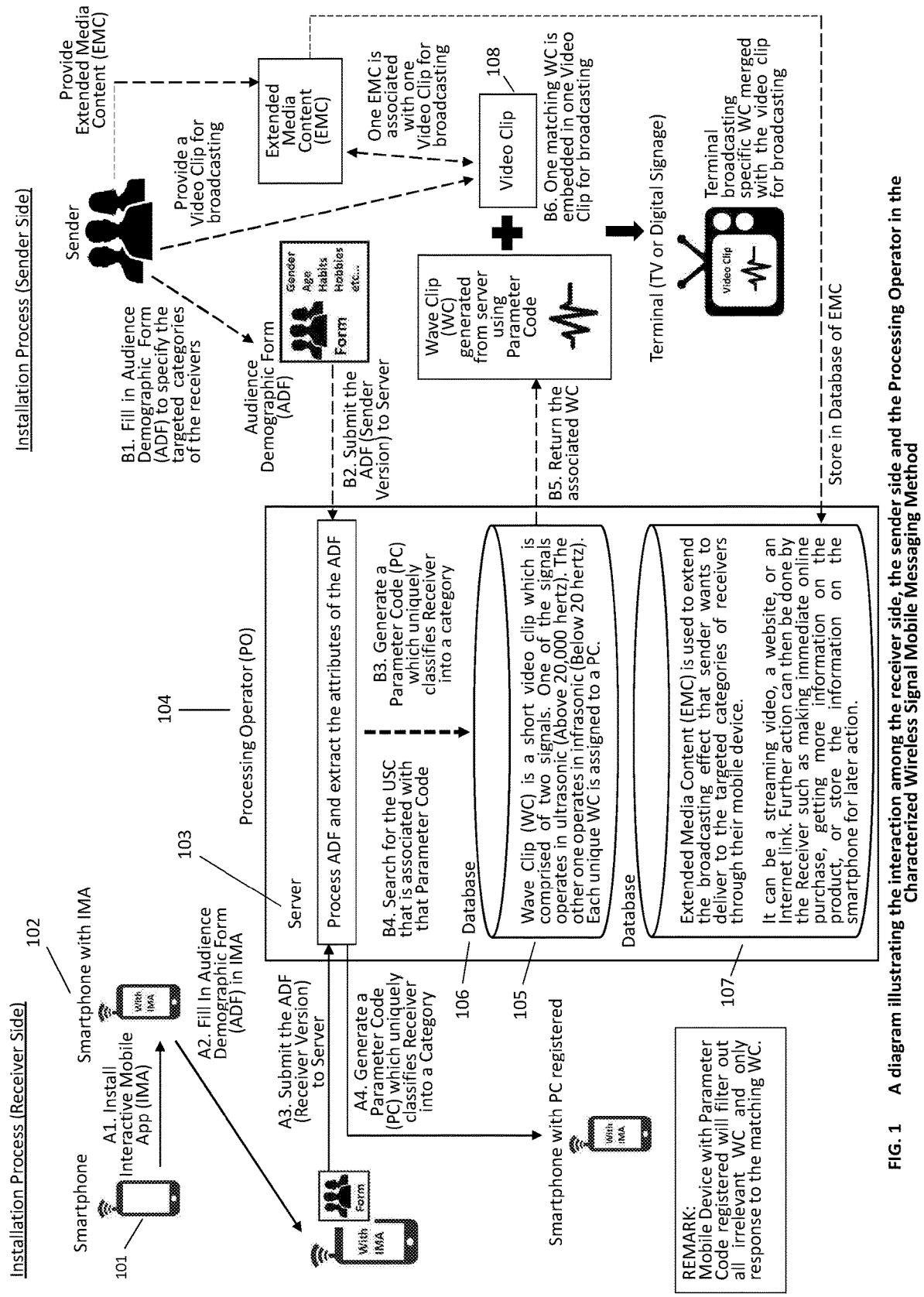
FIG. 1  A diagram illustrating the interaction among the receiver side, the sender side and the Processing Operator in the Characterized Wireless Signal Mobile Messaging Method

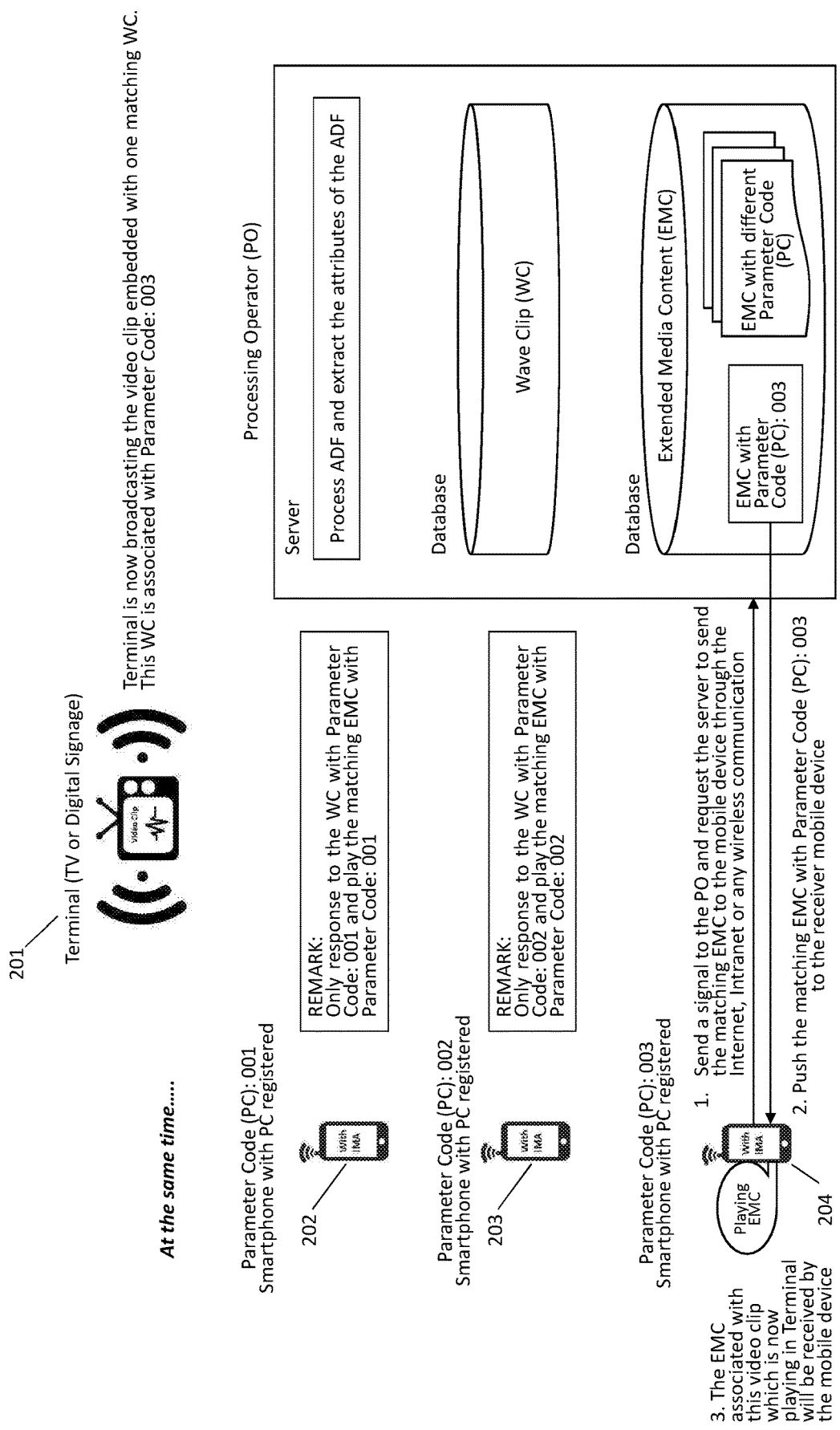
FIG. 2  A diagram illustrating an exemplary application of the Characterized Wireless Signal Mobile Messaging Method

CHARACTERIZED WIRELESS SIGNAL MOBILE MESSAGING METHOD AND SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention discloses methods and systems of communicating signal among promoter, audience, promotion operator by way of wireless signaling and mobile messaging.

2. Description of Related Art Including Information Disclosed Under 37 CFR 1.97 and 37 CFR 1.98.

In the U.S. Pat. No. 7,010,098 B2, the invention discloses a ultrasound proximity detector for a telephone device to detect the proximity of an object thereto includes an ultrasound signal generator generating ultrasound that is broadcast by a speaker of the telephone device.

However, the above invention does not disclose the use of modulated frequency in promotion, in which a receiving mobile unit receives extended promotional message from the terminal broadcasting specific wireless signal merged with promotional message. Also, the above intention does not disclose the use of modulated frequency and the prior art has been leaving a technical problem that the wireless signal does not have the capability to blast a signal accommodating different audience with one or more attributes In the U.S. Pat. No. 5,864,626, the invention discloses a storytelling system that includes a base unit broadcast some blocks of data using signal including ultrasound sound. The system also includes a remote unit that receives the transmitted signal. Further, the system includes a transmitter broadcasting modulated radio signal to remote receiving unit. The transmitted signal may be imposed on the carrier wave by any suitable modulation method, including amplitude modulation, frequency modulation and phase modulation.

However, the above invention does not disclose the use of wireless signal in promotion and in particular, the more sophisticated adoption of a combination of frequency modulation capable to deliver various signals equipped with a matrix form. Therefore, in contemporary promotion model, a receiving mobile unit could not yet be adopted to receive an extended promotional message from the terminal broadcasting specific wireless signal clip merged with the original promotion message in the promotion.

In the PRC patent CN 102592232, the invention discloses an application of broadcasting signal with ultrasonic label in order to provide advertised commodity information to the advertisement receiver. Method in that invention comprises the following steps of: receiving advertisement information which is sent by advertisement publishing equipment and is provided with an ultrasonic label; sending a checking request to a network side, wherein the checking request carries the ultrasonic label; and receiving and displaying commodity information which is sent by the network side and corresponds to the ultrasonic label. The method disclosed by the invention has the advantage of improvement on the advertisement influence.

However, the above invention does not provide any filling of survey form such as audience demographic form by the audience or the advertising operator. Also, the above invention does not disclose that the characterized wireless signal can be designed to be in particular frequency or frequency range and in a particular sound pattern, i.e. each characterized wireless signal can be designed to be in a sound pattern that operates within a particular frequency or frequency range. Therefore, the contemporary steps has the shortcoming that the right advertisement has not been delivered to the right interested audience with particular attributes.

In the PRC patent CN 101587674 B, the invention discloses an advertising device, comprising of a device for generating ultrasonic wave sound directionally.

However, the above invention does not provide a receiving device which receives wireless signals from broadcasting terminal containing specific extended promotional message.

In the PRC patent CN 20070050242, the invention involves an apparatus for locating a person, comprising ultrasonic detector arranged to sense motion in an area in a direction.

However, the above invention does not provide a receiving device which receives wireless signals from broadcasting terminal containing specific extended promotional message.

In the PRC patent CN 202617290 U, the invention discloses a device of using ultrasound to interact with a broadcast program, comprising a signal generating device and a receiving processing device. The signal generating device comprises an ultrasonic signal generating unit, a data conversion unit, an ultrasonic signal and television signal mixing unit and an information sending unit connected orderly, and the receiving processing device comprises an information receiving unit, an ultrasonic decoding unit and a display output unit connected orderly, and receives and processes the information transmitted by the signal generating device.

However, the above invention does not provide any filling of survey form such as audience demographic form by the audience or the advertising operator. Also, the above invention does not disclose that the characterized wireless signal can be designed to be in particular frequency or frequency range and in a particular sound pattern, i.e. each characterized wireless signal can be designed to be in a sound pattern that operates within a particular frequency or frequency range. Further, the above intention does not disclose the use of modulated frequency through interacting with promotion operator in server. Therefore, the contemporary deployment of ultrasound in broadcasting environment has the shortcoming not able to identify the right interested audience with corresponding attributes. It has been causing some wastes in resources, because of the mismatching in the prior art.

In the PRC patent CN 201639685 U, the invention discloses the use of ultrasound for a television to find a remote controller.

However, the above invention does not disclose the use of wireless signal in promotion, in which a receiving mobile unit receives extended advertising content from the terminal broadcasting specific wireless signal merged with advertisement.

In the invention of PRC patent CN 101720034 A, the advertising data stream and audio/video stream are multiplexed through a multiplexer and a DVB modulator and modulated as well as emitted to a digital television transmission network.

However, the above invention does not disclose the use of frequency modulated message multiplexed into the audio channel of the TV and transmitted to the mobile device through the audio channel and further, it has left unresolved the technical problem of lack of combination matrix in the use of signal that the advertiser wasted lots of resources sending data to the wrong audience.

BRIEF SUMMARY OF THE INVENTION

The present invention discloses methods and systems of communicating signals among promoter, audience, promotion operator by way of wireless signal and mobile messaging.

The object of the present invention is to provide a way of enhancing the influence of promotion message in broadcast, which is often shown in a very short time.

Another object of the present invention is make use of tailor-made signal generated from a terminal. By feeding such tailor-made promotion signal to specific categories of target audience at the choice of promoter and target audience, the target audience shall receive the extended form of promotional message that is intended to be delivered by the promoter. A matching mechanism is invented and designed to match the target audience and the promoter.

Further the object of this method and system is that the messaging or promotion or announcement is not in broadcast mode. It can be targeted to a choice of specific type of audience through their mobile devices.

BRIEF DESCRIPTION OF THE SEVERAL VIEWS OF THE DRAWINGS

Further aspects of the present disclosure will be more readily appreciated upon review of the detailed description of its various embodiments, provided below, when taken in conjunction with the accompanying drawing, of which:

FIG. 1 A diagram illustrating the interaction among the receiver side, the sender side and the Processing Operator in the Characterized Wireless Signal Mobile Messaging Method FIG. 2 A diagram illustrating an exemplary application of the Characterized Wireless Signal Mobile Messaging Method

DETAILED DESCRIPTION OF THE INVENTION

The most preferred embodiment of the invention is now described with reference to the figures, where like reference numbers indicate identical or functionally similar elements. While specific configurations and arrangements are discussed, it should be understood that this is done for illustrative purpose only. A person skilled in the art will recognize that the other configurations and arrangements can be used without departing from the scope of the invention.

The present invention provides a way of enhancing the influence of promotion message in broadcast, which is often shown in a very short time.

In this invention, the Audience refers to the receiver of the Promotional Message. A Promoter refers the promoter who wants to place Promotional Message in the Promotion Operator's platform. The Promoter can be the Promotion Operator himself. A Promotion Operator (PO) refers to the merchant that runs a Promotion Platform and places the Promoter's Promotional Message onto his platform. A Promotional Message refers to the Promotional Message that the Promoter wishes to be played at the Terminal through the Promotion Operator's Platform (POP).

A Terminal refers to the device that the Promotional Message is played. It can be, but not limited to, a TV set, a digital signage, an audio player, an audio transmitter or a personal computer. A Characterized Wireless Signal (CWS) refers to a wireless signal that is associated to a promotional campaign. For broader encompassment, CWS can include pattern of wireless signals, which may be in the form of ultra sound, infra-red or visible light as well as radio frequency signal. An Extended Promotional Message (ExPM) refers to the extra Promotional Message that the Promoter wants to push to the Audience onto his mobile device. An Audience Demography Form (ADF) refers to the survey form used to identify a specific segment(s) of the Audience. A Parameter code (PC) refers to a particular code that is assigned to a specific segment or combination of segments of the audience. A Promotion Operator Mobile App (POApp) refers to the Promoter's particular mobile App. that functions as described in this invention.

The method is described as below. The user for this messaging model can be the Promoter or the intended Audience. The intended Audience can use their mobile devices to receive an extended version of the Promotional Message-Extended Promotional Message (ExPM). Such mobile devices can be smartphones or tables. An intended Audience can opt to receive targeted promotion by installing the Promotion Operator Mobile App (POApp). During the installation process, a survey form called the Audience Demographic Form (ADF) must be filled by the Audience which contains his pertinent information. The ADF is uploaded to the Promotion Operator's Platform (POP). One or more attributes are then extracted from this ADF and generate one or more Parameter Codes (PC) that ties with the particular Audience. The one or more PC will be used to classify each Audience into one or more categories. One or more categories can be matched with one or more attributes in the form of matrix.

In a preferred embodiment, an Audience preferring sportswear can be matched with another Audience preferring sports gear and both could, further than his/her attributes, be regarded in the matrix of larger category of sports. Another embodiment could be that, a matrix embracing a larger category of healthy life style is deployed to house a match with two different Audiences with two (or even more) attributes of diet food and/or health supplements on the one hand and sport activities on the other hand. Further and alternative embodiments could be deployed for a larger category of video games housing two individual attributes of racing games and shooting games, for a larger category of CD records accommodating a match of two individual attributes of local singers and international singers, and for alcohol adopted with two attributes of two different Audiences of Wine and beer. One or more Characterized Wireless Signals (CWS) will be associated to the one or more Parameter Code (PC). The intended Audience's mobile device will be adapted to receive the CWS when he opts in through the POApp.

One further embodiment of the invention can be, one Parameter Code (PC) will be associated to more than one Characterized Wireless Signals; or more than one Parameter Codes (PC) may also be associated to the same Characterized Wireless Signals.

Characterized Wireless Signal (CWS) is a short wireless signal in, but not limited to, ultra sound clips, infrared signal, or wireless radio frequency signal, which could be designed to be in particular frequency or frequency range modulated in a particular sound pattern. That is, each CWS is designed to be in a pattern repeated in one or several short interval (typical 2-3 seconds) of same length or different length that operates within one particular frequency or combination several different frequencies or one or combination of several frequency ranges. The POApp is designed to receive the CWS and is adapted to respond to one or more particular type of CWS per user of the mobile device. That particular type of CWS can be in one or combination of several designated frequencies or one or combination of several designated frequency ranges modulated in a designated pattern. This particular CWS is based on the ADF submitted by the particular Audience.

One or more particular categories of audience is defined to have one or more specific attributes. Promoter, through the Promotion Operator platform (POP), classifies the Audience into one or more categories which are identified by one or more Parameter Code (PC). Each category is linked to a particular CWS that is assigned to the same PC. One or more categories can be matched with one or more attributes in the form of matrix. In the above example, further than that each Audience through the particular CWS assigned to the corresponding PC, the Audience liked sportswear and sports gear in the present invention are adopted to respond to a further CWS assigned to bigger category in the matrix, which is assigned with a further unique PC. In a preferred embodiment, therefore, a series of digits are deployed as PC. Such series of digits could be grouped into a number of groups designating the individual attributes on the one hand and the larger categories and their subsets on the other hand. In a preferred embodiment, the PC nine (9) digits grouped into three groups; for example, PC xxxyyyzzz, where xxx could be digits from 000-999 representing a highest category of "entertainment" and the variants in such xxx could be deployed to represent other bigger different categories; where yyy could be digits from 000-999 representing a smaller category of "video games" and the variants in such yyy could be deployed to represent different matrix in this layer representing a combination of matching of individual attributes; and where zzz could be digits from 000-999 representing a detailed category of "racing games" and the variants in such zzz could be deployed to represent even more specific kinds of racing games.

The Promoter will be required to submit his promotional video clip to the Promotion Operator Platform (POP). The Promoter can extend the Promotion effect by submitting an Extended Promotional Message (ExPM) that he wants to be delivered to the targeted category(ies) of the Audience through their mobile devices. The Promotion Operator (PO) will ask the Promoter to specify which category(ies) of Audience he is most likely to target. This can be done by asking the Promoter to input the Promoter version of Audience Demographic Form (ADF). One embodiment of the invention can be the more categories the Promoter chooses, the more expensive the promotion campaign will be. One or more Parameter Code (PC) is generated from this ADF and this will match the particular CWS that has the corresponding one or more PC. The matching CWS will be integrated into the Promotional Message of the Promoter such that when the message is played at the Terminal, the CWS will be transmitted simultaneously.

At the Terminal which is, but not limited to, the TV set or digital signage for which the Promotional Message is played, the integrated CWS will be blasted simultaneously. For those intended Audience whose mobile devices have been activated for that particular CWS, it will trigger a signal through the Promotion Operator Mobile App. (POApp) and is sent to Promotion Operator's (PO) server (i.e. POP) through 3G/4G Internet connections, the Internet, intranet or any kind of wireless communication. When PO's server received the message from that particular Audience, PO will fetch the Extended Promotional Message (ExPM) for that playing Promotional Message and deliver to the matching Audience's mobile device in real time synchronizing with the Promotional Message. In this way, only the specified one or more categories of Audience associated with the currently playing Promotional Message will receive the matching Extended Promotional Message (ExPM) through the Audience's mobile.

One further embodiment of the invention can be, after the one or more specific categories of Audience receive the matching one ExPM or a series of ExPM, such one or more specific categories of Audience will receive another set of one ExPM or series of ExPM.

A description of the operation under this invention is provided. At the Audience side, Audience chooses to install the Promotion Operator Mobile App (POApp). It can be initiated by photo clicking on the QR code displayed at a digital signage or a display content. During the POApp installation process, the audience is requested to input the survey form (the Audience Demography Form—ADF) through his mobile. The survey is then sent to Promotion Operator's (PO) server for processing and one or more Parameter Codes (PC) are generated to associate this Audience which represents a specific demography. The PC is then send back to the Audience and integrate with POApp such that the mobile device will filter out all irrelevant CWS and will respond to just the matching CWS.

When the audience opts in to receive personalized digital promotion message, his mobile is on standby to receive the matching CWS. When a matching CWS is blasted from the Terminal (TV, digital signage or audio transmitter), the POApp enables the Audience mobile to receive that particular one or series of Extended Promotional Message (ExPM) by sending a signal to the Promotion Operator's server and request the server to send the matching ExPM to the mobile device. The matching ExPM is sent through, but no limited to, the 3G/4G wireless Internet connection or the Internet, intranet or any kind of wireless communication. It can be, but not limited to, a message, a streaming video, a website, or just an Internet link.

A further embodiment of this invention is that an Audience can filter unwanted Extended Promotional Messages from the Promotion Operator even if the Audience's mobile device can recognize matching Characterized Wireless Signal.

A further embodiment of this invention is that an Audience's mobile device can respond to all Characterized Wireless Signals blasted from the Terminal, and receive all Extended Promotional Messages from the Promotion Operator even if the Audience's mobile device can only recognize certain Characterized Wireless Signals. Further to this embodiment, the Audience can also filter unwanted Extended Promotional Messages from the Promotion Operator.

A further embodiment of this invention is that further action can then be done by the Audience such as making immediate online purchase, getting more information on the promotion, or just store the information on his personal computer or mobile device for later action. A further embodiment of this invention is that the audience can also opt to store the matching content automatically onto his personal computer or mobile device for later action.

At the Promoter side, Promoter, at the request of the Promotion Operator (PO), submits his Promotional Message that is going to be played at a specific time at the Terminal (TV or digital signage). At the same time, he submits further Promotional Message (the Extended Promotional Message—ExPM) that can be push into the Audience's mobile device through the Internet/intranet or any wireless communication. Promoter is also required to input a form (the Audience Demography Form—ADF) that describes the demography of the audience that the Promoter wants to target. One further embodiment of this invention can be that the larger the sector is, the more costly is to the Promoter. One or more Parameter Code (PC) are generated from the ADF.

One further embodiment of this invention is allowing the Promoter to filter unwanted Audience even if the Audience receive particular CWS so as to reduce the costs of promotion or limited the number of Audience for that promotion.

The PC is associated to a particular CWS so that the Promotional Message will be integrated with that associated CWS and played at the Terminal at the specified time.

At the Promotion Operator side, the Promotion Operator (PO) designs the Audience Demographic Form (ADF). When either the Audience or the Promoter input the Audience Demography Form (ADF), one or more Parameter Codes are generated that uniquely specifies that demography. A demography can be a combination of specific segments of the Audience that have certain attributes.

The Promotion Operator (PO) defines the Characterized Wireless Signal (CWS) into a series by differentiating the signal in one particular frequency or a combination of several different frequencies or several different frequencies modulated in designated pattern or one frequency range or a combination several frequency ranges or several frequency ranges modulated in designated pattern, repeated in short intervals of same or different time length. Each unique CWS is assigned to one or more Parameter Codes (PC).

When the Promotional Message is played at the Terminal, the specific CWS that is integrated with the Promotional Message is blasted.

When the Audience's mobile that is opted to receive targeted Promotional Message and a matching CWS is blasted together with the Promotional Message, POApp triggers a signal to PO's platform so that one or a series of matching Extended Promotional Message (ExPM) is pushed to the Audience mobile device for the Audience further action.

Further, the present invention includes a system for communicating signals among Audience, Promoter, Promotion Operator and Terminal by way of wireless signal and mobile messaging.

The system component of this invention corresponds to the components in the method of this invention and can be used in conjunction with the method described in this invention.

The system in this invention comprises of at least one Audience's mobile device. A Promotion Operator Mobile App adapted to be installed and run in each Audience's mobile device and activated to recognize and respond to matching Characterized Wireless Signal from a Terminal, triggers a signal from Audience to the Promotion Operator and receives one or more matching Extended Promotional Messages in Audience's mobile device. A survey form, Audience version of Audience Demography Form, contains Audience's pertinent information, input by the Audience, wherein the information in the said Audience Demography Form is uploaded to a Promotion Operation Platform.

At the server side, a Promotion Operator's processing unit or platform extracts attributes from the said Audience version of Audience Demography Form. The Promotion Operator generates one or more Parameter Codes associating the Audience representing a specific demography. The Promotion Operator uses one or more Parameter Codes to classify Audience into one or more categories. The Promotion Operator assigns a Characterized Wireless Signal to the Parameter Codes. The Promotion Operator sends back the one or more Parameter Codes to the Audience which integrates the one or more Parameter Codes with Promotion Operator Mobile App activated to recognize a particular Characterized Wireless Signal. The Promotion Operator generating one or more Parameter Code from the Promoter version of Audience Demography Form. The Promotion Operator assigns a unique Characterized Wireless Signal to the Parameter Codes generated from the Promoter version of Audience Demography Form. The Promotion Operator delivers the Extended Promotional Message to the matching Audience's mobile device in real time synchronizing with a Promotional Message. Further, at least one database presents at the server storing Characterized Wireless Signal. In addition, at least one database present at server storing Extended Promotional Message;

The system further comprises of at least one Promoter's terminal that submits a Promotional Message to the Promotion Operator Platform. The Promoter submits an Extended Promotional Message that the Promoter wants to deliver to the targeted category of the Audience by the Promoter and integrates the Characterized Wireless Signal with the Promotional Message of the Promoter. A survey form, Promoter version of Audience Demography Form, describes the demography of the audience that the Promoter wants the Promotion Operator to target, input by the Promoter.

The system further comprises of at least one Terminal device playing Promotional Message and blasting Characterized Wireless Signal simultaneously.

FIG. 1 illustrates the interaction among the receiver side, the sender side and the Processing Operator in the Characterized Wireless Signal Mobile Messaging Method.

Refer to the FIG. 1. In the receiver side, first, the Audience, using his smartphone 101, install an Interactive Mobile App (IMA). Second, the Audience in receiver side input an Audience Demographic Form (ADF) in IMA through the smartphone with IMA 102. Third, the Audience, through the smartphone with IMA 102, submit the ADF (receiver version) to server 103 in the Processing Operator 104. The server 103 process ADF and extract the attributes of the ADF. Fourth, the server 103 in the Processing Operator 104 generates a Parameter Code (PC) which uniquely classifies Receiver into one or more categories. The server 103 in the Processing Operator 104 also contains a computer processing unit to conduct the matrix of matching of one or more categories into one or more attributes and eliminations of unwanted Audience. The smartphone with Parameter Code registered will filter out all irrelevant Wave Clip 105 in the database 106 of Processing Operator and only respond to the matching Wave Clip 105. A Wave Clip 105 is a short video clip which is comprised of two signals. One of the signals operates in ultrasonic (above 20,000 hertz). The other one operates in infrasonic (below 20 hertz). Each unique Wave Clip is assigned to a Parameter Code.

In the sender side, first, the sender input Audience Demographic Form (ADF) to specify the targeted categories of the receivers. The Audience Demographic Form contains items including gender, age, habits, interested services, interested products and/or hobbies, etc. The sender also provides Extended Media Content (EMC) 107 to a database in server. The Extended Media Content (EMC) can be an example of Extended Promotional Message. The Extended Media Content (EMC) 107 is used to extend the broadcasting effect that sender wants to deliver to the targeted categories of receivers through their mobile device. It can be a streaming video, a website, or an Internet link. Further action can then be done by the Receiver such as making immediate online purchase, getting more information on the product, or store the information on the smartphone for later action. One Extended Media Content (EMC) is associated with one Video Clip 108 for broadcasting or/and returns to smartphone 101. Second, the sender submits the ADF (sender version) to server 103 in Processing Operator 104. Third, the server 103 in Processing Operator 104 generates one or more Parameter Codes (PC) which uniquely classifies Receiver into one or more categories and sends to the database which Wave Clip is stored. Fourth, the server 103 in Processing Operator 104 searches for the wireless signal, which could be (but not limited to) in the form of the ultrasound clip (USC) and/or infrasonic chip that is associated with that Parameter Code. Fifth, the server 103 in Processing Operator 104 returns the associated Wave Clip 105 generated from server using Parameter Code. Sixth, the Wave Clip 105 generated, i.e. the matching Wave Clip 105 is embedded in one Video Clip 108 for broadcasting. The Terminal, which can be TV or digital signage, broadcasts specific Wave Clip 105 merged with the video clip for broadcasting.

FIG. 2 illustrates an exemplary application of the Characterized Wireless Signal Mobile Messaging Method.

Refer to FIG. 2, in the example, the Terminal 201 is broadcasting the video clip embedded with one matching Wave Clip which is associated with Parameter Code 003. The Terminal 201 can be a TV or Digital Signage.

At the same time, a smartphone with Interactive Mobile App (IMA) 202 is registered with Parameter Code (PC) number 001. However, that smartphone 202 only responds to the Wave Clip with Parameter Code number 001 and plays the matching Extended Media Content (EMC) with Parameter Code number 001, but not Parameter Code number 003, i.e. that smartphone does not play any Extended Media Content (EMC).

At the same time, a smartphone with Interactive Mobile App (IMA) 203 is registered with Parameter Code (PC) number 002. However, that smartphone 203 only responds to the Wave Clip with Parameter Code number 002 and plays the matching Extended Media Content (EMC) with Parameter Code number 002, but not Parameter Code number 003, i.e. that smartphone does not play any Extended Media Content (EMC).

At the same time, a smartphone with Interactive Mobile App (IMA) 204 is registered with Parameter Code (PC) number 003. That smartphone 204 only responds to the Wave Clip with Parameter Code number 003 and plays the matching Extended Media Content (EMC) with Parameter Code number 003. First, that smartphone 204 sends a signal to Processing Operator (PO) and requests the server to send the matching Extended Media Content (EMC) to the mobile device through internet, intranet or any wireless communication. Second, the Processing Operator pushes the matching Extended Media Content (EMC) with Parameter Code (PC) number 003 to the receiver mobile device. Third, the Extended Media Content (EMC) associated with this video clip which is now playing in Terminal will be received by the mobile device. Then, the smartphone 204 plays the Extended Media Content (EMC).

The method described in this invention can be used in, but not limited to, mobile messaging, TV promotion, digital-out-of-home promotion, storefront promotion, location specific promotion, online video, announcement or other media such as movie, public spot. An advantage of this method is that the messaging or promotion or announcement is not in broadcast mode. It can be targeted to a choice of specific type of Audience through their mobile devices.

Also, only the specified category or categories of audience associated with the currently playing promotion message will receive the matching one or a series of Extended Promotional Message (ExPM) through the audience's mobile device.

As setting forth in the abovementioned embodiments, changes therein and other uses will occur to those skilled in the art which are encompassed within the scope of the invention as defined by the scope of the claims.

All references, including any patents or patent applications cited in this specification, if any, are hereby incorporated by reference. No admission is made that any reference constitutes prior art.

The discussion of the references states what their authors assert and the applicant reserves the right to challenge the accuracy and pertinency of the cited documents. It will be clearly understood that, although a number of prior art publications are referred to herein, if any, this reference does not constitute an admission that any of these documents form part of the common general knowledge in the art, in anywhere in the world.

It is an object of the present invention to address the foregoing problems or at least to provide the public with a useful alternative choice.

Further aspects and advantages of the present invention will become apparent from the ensuring description which is given by way of example only.

I claim:

1. A method of communicating signals among Promoter, Audience and Promotion Operator by way of wireless signal and mobile messaging, comprising the steps of,
   (i) installing a Promotion Operator Mobile App by the Audience using mobile devices;
   (ii) inputting, from the Audience, a survey form, which contains an Audience's pertinent information and first Audience Demographic Form;
   (iii) uploading the information contained in the Audience Demographic Form to a Promotion Operator Platform;
   (iv) extracting attributes from said first Audience Demographic Form by the Promotion Operator in the Promotion Operator Platform;
   (v) generating one or more first Parameter Codes associating the Audience representing a specific demography by the Promotion Operator;
   (vi) using said one or more first Parameter Codes to classify Audience into one or more categories by Promotion Operator;

(vii) assigning a first Characterized Wireless Signal to the Parameter Code by Promotion Operator;
(viii) sending back said one or more first Parameter Codes to the Audience by the Promotion Operator via the first Characterized Wireless Signal;
(ix) integrating said one or more first Parameter Codes with Promotion Operator Mobile App;
(x) activating the Promotion Operator Mobile App to recognize one or more second Characterized Wireless Signals;
(xi) sending a Promotional Message to the Promotion Operator Platform by the Promoter;
(xii) submitting an Extended Promotional Message that the Promoter wants to deliver to the targeted category of the Audience by the Promoter;
(xiii) inputting a second Audience Demography Form that describes the demography of the audience that the Promoter wants the Promotion Operator to target by the Promoter
(xiv) generating one or more second Parameter Code from said second Audience Demography Form by the Promotion Operator;
(xv) assigning a unique second Characterized Wireless Signal to said second Parameter Code by Promotion Operator;
(xvi) integrating the second Characterized Wireless Signal with the Promotional Message of the Promoter;
(xvii) playing the Promotional Message and blasting second Characterized Wireless Signal simultaneously at Terminal;
(xviii) recognizing and responding the second Characterized Wireless Signal from the Terminal by the activated Promotion Operator Mobile App;
(xix) triggering a signal through the Promotion Operator Mobile App from Audience whose mobile devices have been activated for that particular second Characterized Wireless Signal to the Promotion Operator;
(xx) delivering the Extended Promotional Message to the matching Audience's mobile device in real time synchronizing with the Promotional Message by the Promotion Operator; and
(xxi) receiving one or more matching Extended Promotional Messages in Audience's mobile device.

2. The method of claim 1, wherein the installation of Promotion Operator Mobile App is initiated by photo clicking on the QR code displayed at a digital signage or a display content.

3. The method of claim 1, wherein the mobile devices are smartphones or tablets.

4. The method of claim 1, wherein the Audience Demography Form contains gender, age, habits, interested services, interested products and/or hobbies.

5. The method of claim 1, wherein the demography is a combination of specific segments of the Audience that have certain attributes.

6. The method of claim 1, wherein the first Parameter Code uniquely specifies the demography.

7. The method of claim 1, wherein one or more categories have one or more specific attributes.

8. The method of claim 7, wherein one or more categories are matched with one or more attributes.

9. The method of claim 1, wherein said first or second Characterized Wireless Signals are adopted as short wireless signal in ultra sound clips, infrasonic clips, infrared signal or wireless radio frequency signal.

10. The method of claim 9 wherein the Characterized Wireless Signal is adopted as in one particular frequency or a combination of several different frequencies or several different frequencies modulated in designated pattern or one frequency range or a combination of several frequency ranges or several frequency ranges modulated in designated pattern.

11. The method of claim 10, wherein said first or second Characterized Wireless Signals are adopted as in a pattern repeated in one or several short interval of same length or different length.

12. The method of claim 11, wherein the short interval pattern repeats in a range of 2 to 3 seconds.

13. The method of claim 1, further comprising the step of assigning more than one said first Characterized Wireless Signals to the first Parameter Code.

14. The method of claim 1, further comprising the step of associating one or more first or second Parameter Codes with the same second Characterized Wireless Signal.

15. The method of claim 1, wherein the recognition of the second Characterized Wireless Signal is achieved by adapting the Audience's mobile device to receive and respond to the matching second Characterized Wireless Signal and to filter out other irrelevant Characterized Wireless Signal.

16. The method of claim 1, wherein the Promotional Message is a video clip.

17. The method of claim 1, wherein the Extended Promotional Message is a message, a streaming video, a web site or an Internet link.

18. The method of claim 17, wherein the Extended Promotional Message is stored in the database of Promotion Operator.

19. The method of claim 1 wherein Terminal is TV, digital signage, audio player, audio transmitter or personal computer.

20. The method of claim 1, wherein on receiving of matching the second Characterized Wireless Signal, the activated Audience's mobile device for the matching signal will be triggered and send a signal to the Promotion Operator to request the Promotion Operator's server to send the matching Extended Promotional Message to Audience's mobile device.

21. The method of claim 20, wherein the signals from the Audience's mobile devices through the Promotion Operator Mobile App to the Promotion Operator is sent through 3G or 4G wireless internet connection, the Internet or intranet or any wireless communication.

22. The method of claim 1, wherein the Promotion Operator receiving signals from the Audience's mobile devices through the Promotion Operator Mobile App, the Promotion Operator's server fetches an Extended Promotional Message for that playing Promotion Message by the Promotion Operator when the Promotion Operator's server receive the message from that particular Audience; and deliver the Extended Promotional Message to the matching Audience's mobile device in real time synchronizing with the Promotional Message by the Promotion Operator.

23. The method of claim 22 wherein the matching Extended Promotional Message is sent through 3G or 4G wireless internet connection, the Internet or intranet or any wireless communication.

24. The method of claim 1, further comprising the step of Promoter filtering unwanted Audience even if the Audience's mobile device can recognize matching the second Characterized Wireless Signal.

25. The method of claim 1, further comprising the step of Audience filtering unwanted Extended Promotional Messages from the Promotion Operator even if the Audience's mobile device can recognize matching Characterized Wireless Signal.

26. The method of claim 1, wherein the first Audience Demographic Form is an Audience version of the Audience Demographic Form, and the second Audience Demographic Form is a promoter version of the Audience Demographic Form.

27. The method of claim 1, further comprising the step of Audience filtering unwanted Extended Promotional Messages from the Promotion Operator.

28. The method of claim 1, further comprising the step of making immediate online purchase by the Audience.

29. The method of claim 1, further comprising the step of getting more information on the promotion by the Audience.

30. The method of claim 1, further comprising the step of storing the information in the matching Extended Promotional Message in the Audience's personal computer or mobile device for later action.

31. The method of claim 1, further comprising the step of storing the content of the matching Extended Promotional Message automatically onto his personal computer or mobile device for later action.

32. The method of claim 1, further comprising the step of receiving another set of one or series of Extended Promotional Messages in Audience's mobile device.

33. The method of claim 1 is used in mobile messaging, TV promotion, digital-out-of-home promotion, storefront promotion, location specific promotion, announcement, online video, movie or public spot.

34. A system for communicating signals among Audience, Promoter, Promotion Operator and Terminal by way of wireless signal and mobile messaging, comprising
   (i) at least one Audience's mobile device;
   (ii) a Promotion Operator Mobile App adapted to be installed and run in each Audience's mobile device and activated to recognize and respond to a second Characterized Wireless Signal from a Terminal, triggering a signal from Audience to the Promotion Operator and receiving one or more matching Extended Promotional Messages in Audience's mobile device;
   (iii) a survey form, a first Audience Demography Form, and Audience's pertinent information, input by the Audience, wherein the information in the said first Audience Demography Form is uploaded to a Promotion Operation Platform;
   (iv) a Promotion Operator's processing unit or platform at server extracting attributes from the said Audience version of Audience Demography Form, generating one or more first Parameter Codes associating the Audience representing a specific demography, using one or more first Parameter Codes to classify Audience into one or more categories, assigning first Characterized Wireless Signals to the first Parameter Codes, sending back the one or more first Parameter Codes to the Audience which integrates the one or more first Parameter Codes with Promotion Operator Mobile App activated to recognize a particular first Characterized Wireless Signal, generating one or more second Parameter Code from the second Audience Demography Form and assigning a unique Characterized Wireless Signal to the Parameter Codes generated from the Promoter version of Audience Demography Form, and delivering the Extended Promotional Message to the matching Audience's mobile device in real time synchronizing with a Promotional Message;
   (v) at least one database at server storing Characterized Wireless Signals;
   (vi) at least one database at server storing Extended Promotional Messages;
   (vii) at least one Promoter's terminal submitting a Promotional Message to the Promotion Operator Platform, submitting an Extended Promotional Message that the Promoter wants to deliver to the targeted category of the Audience by the Promoter and integrating the Characterized Wireless Signal with the Promotional Message of the Promoter; a survey form, a first Audience Demography Form, describing the demography of the audience that the Promoter wants the Promotion Operator to target, input by the Promoter;
   (viii) at least one Terminal device playing Promotional Message and blasting second Characterized Wireless Signal simultaneously.

35. The system of claim 34 wherein the Promotion Operator Mobile App is initiated by photo clicking on the QR code displayed at a digital signage or a display content.

36. The system of claim 34, wherein the mobile device are smartphones or tablets.

37. The system of claim 34, wherein the Audience Demography Form contains gender, age, habits, interested services, interested products and/or hobbies.

38. The system of claim 34, wherein the Parameter Code uniquely specifies the demography.

39. The system of claim 34, wherein one or more categories have one or more specific attributes.

40. The system of claim 39, wherein one or more categories are matched with one or more attributes.

41. The system of claim 34, wherein the device adapted to generate signal, said first or second Characterized Wireless Signals, which is short wireless signal in ultra sound clips, infrasonic clips, infrared signal or wireless radio frequency signal.

42. The system of claim 41, wherein a device adapted to generate signal, said first or second Characterized Wireless Signal, which is in one particular frequency or a combination of several different frequencies or several different frequencies modulated in designated pattern or one frequency range or a combination several frequency ranges or several frequency ranges modulated in designated pattern.

43. The system of claim 42, wherein the device adapted to generate signal, said first or second Characterized Wireless Signal, which is in a pattern repeated in one or several short interval of same length or different length.

44. The system of claim 43, wherein the pattern repeated in a range of 2 to 3 seconds.

45. The system of claim 34, wherein the recognition of a device adapted to generate signal, said first or second Characterized Wireless Signal, is achieved by adapting the Audience's mobile device to receive and respond to the matching second Characterized Wireless Signal and to filter out other irrelevant first Characterized Wireless Signal.

46. The system of claim 34, wherein the Promotion Message is a video clip.

47. The system of claim 34, wherein the Extended Promotional Message is a message, a streaming video, a website or an Internet link.

48. The system of claim 34, wherein the Terminal device includes a TV set, a digital signage, an audio player, an audio transmitter or a personal computer.

49. A system of claim 34, wherein the server contains at least one database storing Promotional Message.

50. The system of claim 34 is adapted and used in mobile messaging, TV promotion, digital-out-of-home promotion, storefront promotion, location specific promotion, announcement, online video, movie or public spot.

51. The system of claim 34, wherein the first Audience Demographic Form is an Audience version of the Audience Demographic Form, and the second Audience Demographic Form is a promoter version of the Audience Demographic Form.

* * * * *